April 6, 1965 J. P. MURDOCH 3,176,760
HEATING AND COOLING SYSTEM
Filed May 14, 1962 2 Sheets-Sheet 2

INVENTOR.
John P. Murdoch,
BY
Paul & Paul
ATTORNEYS.

United States Patent Office 3,176,760
Patented Apr. 6, 1965

3,176,760
HEATING AND COOLING SYSTEM
John P. Murdoch, 204 Glenn Road, Ardmore, Pa.
Filed May 14, 1962, Ser. No. 194,285
19 Claims. (Cl. 165—29)

This invention relates to heating and cooling systems. More particularly, this invention relates to heating and cooling systems adapted to the utilization of refrigeration apparatus adjunctive thereto. Still more particularly, this invention relates to means and method for the utilization, in a heating and cooling system, of the waste heat of adjunctive refrigeration apparatus.

Ordinarily installations of refrigeration apparatus in large stores, super markets, and similar places, are arranged to place the heat absorbing elements of the refrigeration apparatus in the store area in which the cooling and freezing compartments are located, and, to place the heat dissipating elements of the apparatus, such as the condensing units, in another room remote from the store area, as in the basement, for example. It is well known that under ordinary operating conditions the condensing units of refrigeration apparatus give off more energy, in the form of heat, than is put into the refrigeration system for the mechanical operation thereof. It is well known, also, that the temperature of the air surrounding such condensing units must be maintained within maximum and minimum limits in order to achieve the optimum operation thereof. This is ordinarily achieved by passing a flow of air across the condensing units and maximum and minimum temperatures are ordinarily specified for the "air on the condensers" and the "air off the condensers." As a consequence, in order to maintain optimum operating temperatures in the vicinity of such condensing units, the excess heat produced thereby must be removed therefrom and conveyed elsewhere. Heretofore, great difficulty has been encountered in the efficient utilization of the waste heat of the condensing units of the refrigeration apparatus in a heating system for the building in which the apparatus is installed, although it will be readily appreciated that efficient means and method for such utilization of the waste heat of the condensing units of refrigeration apparatus to heat other parts of the building in which the apparatus is located, will effect a marked economy by sharply reducing the cost of heating the building.

Accordingly, it is an object of this invention to provide in a heating and cooling system utilizing refrigeration apparatus adjunctive thereto, means and method for providing for the efficient and dependable operation of the system to maintain comfortable conditions throughout the year in the building in which the system is installed.

It is another object of this invention to provide in a heating system utilizing refrigeration apparatus adjunctive thereto, efficient means and method for the utilization of the waste heat of the condensing units of the refrigeration apparatus.

It is another object of this invention to provide in a heating system utilizing refrigeration apparatus adjunctive thereto, means and method for controlling the temperature of air passing over the condensing units of the refrigeration apparatus.

It is another object of this invention to provide in a heating system utilizing refrigeration apparatus adjunctive thereto, means and method for maintaining the temperature of the air passing over the condensing units of the refrigeration apparatus within controlled limits.

It is another object of this invention to provide in a heating system utilizing refrigeration apparatus adjunctive thereto, means and method for maintaining the temperature of the air passing off the condensing units of the refrigeration apparatus within controlled limits.

It is another object of this invention to provide in a heating system having refrigeration apparatus adjunctive thereto, means and method for circulating air throughout the building in which the system is installed, for utilizing return air drawn from remote parts of the building being heated, and for mixing such return air with fresh air from outside the building to provide a healthful and comfortable environment.

It is another object of this invention to provide in a heating system having refrigeration apparatus adjunctive thereto, improved ducting and damper means for distributing air throughout the building in which the system is installed.

Other objects and attendant advantages of the invention will become more fully apparent hereinafter and in the drawings wherein.

Figure 2:
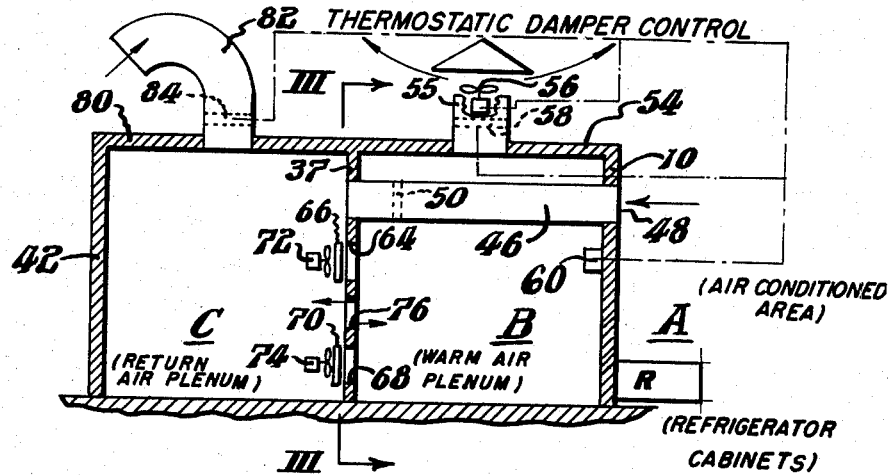
FIG. 2 is a sectional view of the system taken as indicated by the lines and arrows II—II of FIG. 1.
Figure 3:
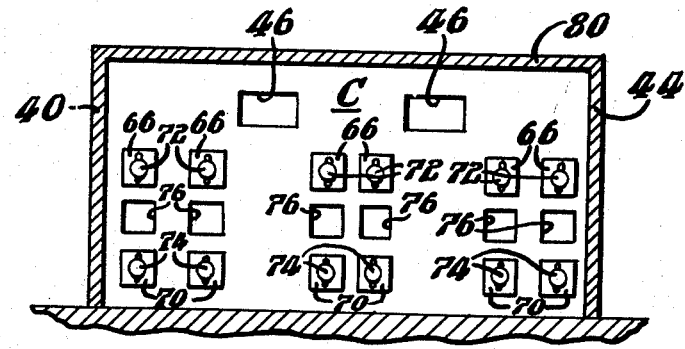

And FIG. 3 is a sectional view of the heating system taken as indicated by the lines and arrows III—III of FIG. 2.

The following detailed description is directed to the specific forms of the invention illustrated in the drawings and are not intended to be addressed to the scope of the invention itself, which may be practiced in a wide variety of forms and arrangements.

Figure 1:
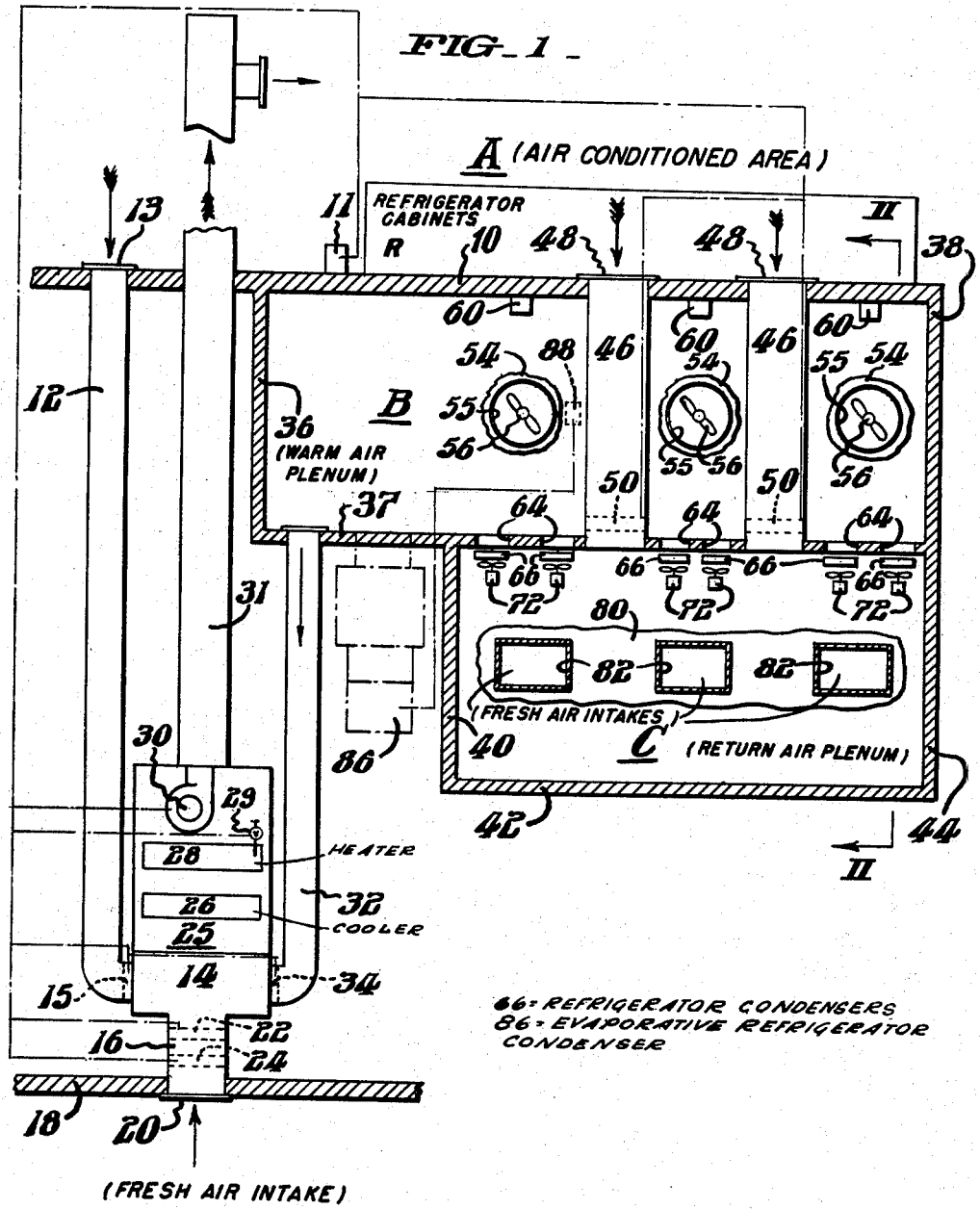
FIG. 1 is a diagrammatic view in plan of a heating and cooling system as provided in accordance with this invention.

Adverting herewith to the specific form of the invention illustrated in the drawings, a heating system as provided in accordance with this invention is diagrammatically shown in FIG. 1 installed in a building wherein a wall 10 separates an occupied or conditioned area A to be heated or cooled from the main components of the heating and cooling system incorporating part of the heat dissipating elements of installed refrigeration apparatus. To the wall 10 in area A is mounted a thermostat 11. An air duct 12 having a return air intake 13 leading from the area A, passes through the wall 10 and leads to an air mixing plenum 14 through a motorized damper 15 positioned in the duct 12 adjacent thereto. From the mixing plenum 14 an air duct 16 leads through an outer wall 18 to provide a fresh air intake 20 for admission of outside air into the duct 16 and consequently into the system. Positioned in the duct 16 are motorized dampers 22 and 24, the purpose of which will be explained more fully hereinafter. The mixing plenum 14 comprises a part of an air handling unit 25 in which are contained a cooling coil 26, a heating coil 28 having a steam valve 29 connected thereto and a blower unit 30. Connecting the air handling unit 25 with area A is a supply air duct 31. A third duct 32 leads from the air mixing plenum 14 through a motorized damper 34 to an area B bounded by the wall 10 and walls 36, 37 and 38. The duct 32 passes through the wall 37 to open into the area or plenum B. Separated from plenum B by the wall 37 is an adjacent area or plenum C further bounded by walls 40, 42 and 44. Ducts 46, having return-air intakes 48, extend through the wall 10 and traverse plenum B to the opposite side thereof to pass through the wall 37 to open into plenum C. Dampers 50 are positioned in each of the return air ducts 46. Positioned in the roof 54 of plenum B are spaced exhaust ducts 55 having fans 56 positioned therein. Motorized dampers 58 are also positioned in the ducts 55 immediately below the fans 56. Mounted adjacent the wall 10 within plenum B are thermostats 60 having a spaced relation corresponding to that of the exhaust ducts 55. The spacing of the exhaust ducts 55 and the thermostats 60 within plenum B serves to divide plenum B generally into several unenclosed areas.

As may be clearly seen in FIGS. 1 and 2, the partition wall 37 between plenum B and plenum C is provided with a row of upper openings 64, before each of which openings 64 is positioned a condensing unit 66 of refrigeration apparatus to form an upper bank thereof. A row of lower openings 68 is correspondingly provided in the partition wall 37 before each of which is positioned a condensing unit 70 to form a lower bank thereof. As may be clearly seen in FIGS. 1 and 2 the condensing units are spaced within plenum C along the wall 37 in a manner generally corresponding to the spacing of the exhaust ducts 55 in plenum B. It will be appreciated, however, that many variations may be made in the spacing within the scope of the present invention. Behind each of the condensing units 66 within plenum C is a fan 72, which fans form an upper bank thereof and behind each of the condenser units 70 is a fan 74, which fans form a lower bank thereof. As may best be seen in FIGS. 2 and 3, openings 76 are provided in the partition wall 37 between the upper and lower banks of condensers 66 and 70 respectively. The openings 76 in the partition wall 37 are furthermore positioned in general alignment with the openings 64 and 68 in the aforesaid partition wall to form substantially vertical columns of openings. Leading through the roof 80 of plenum C are fresh air ducts 82 which have a spaced relation generally corresponding to that of the condensers and fans along the wall 37 in plenum C. A motorized damper 84 is provided in each of the ducts 82 which functions in a manner and for a purpose to be explained more fully hereinafter.

Optionally, in accordance with this invention, an air conditioning evaporative condenser 86, as shown in dot-dash lines in FIG. 1, may be placed adjacent the wall 37 exterior of plenum B and provided with an air duct leading from plenum B through the roof of the building. Likewise, optionally a thermostat 88, shown in dotted lines in FIG. 1, may be positioned in plenum B and connected to the evaporative condenser fan.

*Operation*

In the operation of the heating and cooling system as provided in accordance with this invention and described above, the blower 30 continuously forces a given volume of air at a constant rate through the duct 31 into the occupied area A to be heated or cooled as the case may be. The blower 30 draws air from the mixing plenum 14, to which air may be supplied through ducts 12, 16, and 32 in various combinations by adjusting dampers 15, 22, 24 and 34. Return air is supplied to the mixing plenum 14 from the area A through duct 12, fresh air is supplied to the mixing plenum 14 through the fresh air intake 20 and duct 16, and a mixture of heated fresh air and return air is supplied to the mixing plenum 14 through the duct 32. Return air from area A is drawn by the blower 30 into plenum C through ducts 46 and may there be mixed with fresh air entering plenum C through the roof ducts 82. Air from plenum C passes across those of the condensing units 66 and 70 which may be in operation at any given time through openings 64 and 68 into plenum B and thence into the duct 32. The exhaust ducts 55 and the fans 56 exhaust air from plenum B in circumstances to be described more fully hereinafter.

The temperature of the occupied area A is maintained in the winter by means of the thermostat 11 which is in electrical connection with dampers 15, 22, 24, 34 and 50. In winter, dampers 24 and 50 are normally open and damper 15 is normally closed. The mixing dampers 22 and 34 operate inversely so that when damper 22 is fully closed, damper 34 is fully opened and vice-versa. With damper 34 partially open for normal wintertime operation, air which has been heated by condensing units 66 and 70, in a manner to be explained more fully hereinafter, is drawn by the blower 30 into the mixing plenum 14 from the air duct 32 and is there mixed, since damper 34 is not fully open, with a quantity of fresh air which enters the mixing plenum through the open damper 24 and through the at least partially opened damper 22 in the fresh air intake duct 16. When the temperature in area A is below the minimum setting of the thermostat 11 and a maximum amount of heated air is required, damper 34 opens fully and damper 22 closes fully so that only heated air is supplied to the mixing plenum 14. Under these conditions when the blower 30 is supplying 100% heated air from the air handling unit through the duct 31 to the area A, and the temperature has still not risen therein to the minimum setting of the thermostat 11, the aforesaid thermostat actuates the heating coils 28 by opening the steam valve 29 on the aforesaid coils to provide auxiliary heating of the air supplied to the air handling unit 25 through the duct 32. Auxiliary heating by means of heating coils 28 will continue until the temperature in the area A rises to the required minimum, after which the thermostat will cause the valve 29 to close thereby deactivating the heating coils.

When the temperature in the area A rises above the maximum predetermined setting of the thermostat 11, the aforesaid thermostat will actuate the modulating dampers 22 and 34, causing damper 34 to close and damper 22 to open until damper 34 is 100% closed and damper 22 100% open, at which time 100% fresh air is supplied to the area A by the blower 30, thereby cooling the area A as much as possible without resorting to mechanical refrigeration means.

If the temperature in the area A should continue to rise, the thermostat 11 actuates the cooling coils 26. Alternatively, a separate indoor or outdoor thermostat may be used to actuate the cooling coil. When the cooling coils 26 are actuated, the thermostat 11 at the same time actuates damper 15 to open fully, damper 34 remains closed, damper 22 remains open and damper 24 closes the fresh air intake to the position that will provide the minimum fresh air requirement. When damper 15 opens, dampers 50 in the return air ducts 46 to plenum C close.

In the normal operation of the heating and cooling system as provided in accordance with this invention, it should be appreciated that temperatures in plenum C must be within the limits, low and high, that the condensing units of the refrigeration apparatus have been designed for, and that it is desirable also to maintain plenum B at a temperature high enough to provide maximum heat to the mixing plenum 14 through the duct 32 so that the greatest amount of heat produced by the condensing units is available for heating area A and at a temperature low enough to keep the "air off the condensers" within the limits of the condensing units design.

The return air from area A is drawn through the intakes 48 and the ducts 46 into the plenum C where it is mixed with fresh air drawn into plenum C through the ducts 82. The volume and the temperature of return air entering plenum C through the return air ducts are known, and, accordingly, the dampers 84 in the fresh air ducts 82 are initially opened to the minimum setting which will admit outdoor air, at the lowest anticipated air temperature for the locality in which the building is located, in sufficient quantity to provide the desired minimum temperature in plenum C. It will be appreciated that the quantity of return air entering plenum C through the ducts 46 varies with the position of damper 34. When damper 34 approaches the closed position, due to the heating load on the area A being lessened because the outdoor air temperature is higher than the minimum expected, the reduced quantity of return air mixed with higher temperature outdoor air will stay above the minimum temperature required for "air on the condensers." In certain cases, however, it may be desirable when adjusting the dampers 84 to a minimum setting, to close the dampers completely. The operative connection between thermostat 60 and the dampers 84 is illustrated diagrammatically by the broken line in FIGURE 2.

In order to implement understanding of the invention, the following description will be made of the operation of the heating and cooling system in various stages of the operation of the condensing units of the refrigeration apparatus:

When none of the condensing units are in operation (an abnormal condition) the dampers 84 in the fresh air ducts 82 are open to a minimum, the exhaust fans 56 in the ducts 55 are not running and the dampers 58 in the ducts 55 are closed. The temperatures in plenum B and plenum C are the same and air returning to plenum C through ducts 46 mixes with the minimum quantity of fresh air allowed by dampers 84 to enter plenum C through the ducts 82, and is pulled through openings 64, 68, or 76 in the partition wall 37 into plenum B by the blower 30 which acts through the duct 32. In the abnormal circumstances described, all the heat required for heating the area A would then have to come from the auxiliary heat source 28.

As several of the condensing units 66 and 70 are put into normal operation their fans 72 and 74 also start, but since the air quantity that the aforesaid fans handle is still less than the amount of air that is pulled into plenum C through return air ducts 46 and fresh air ducts 82 and out of plenum B through the ducts 32, the excess air passes from plenum C to plenum B through openings 76 and through the openings 64 and 68 adjacent those of the condensing units 66 and 70 which remain in an idling condition. As more of the fans 72 and 74 are called upon to run, the point is reached where more air is required for the operating condensing unit fans than is pulled into plenum C through return air ducts 46 and fresh air ducts 82 and from plenum B through the duct 32. The excess air required by the operating condenser unit fans is obtained by a flow of air from plenum B back into plenum C through the openings 76 and also openings 64 and 68 in front of the idling condensing units. The excess air, drawn from plenum B through the openings 76 and the openings 64 and 68 in front of the idling condensing units has been previously heated, as described above, by passing over the condensers 66 and 70 that had been running prior to its entry into plenum B. As the previously heated air passes again over the condensers 66 and 70 from plenum C to plenum B, it is reheated by the heat dissipated by the condensing units that are in operation. As the heating system and condensing units continue to operate, air is again drawn back from plenum B to C through the openings 76 and again passed over the condensing units 66 and 70, thereby again reheating the air. Thus a constant circulation and recirculation of air back and forth between plenum B and plenum C through the openings 64 and 68 in front of the operating condensing units in one direction and through the openings 76 and the openings 64 and 68 in front of the idling condensing units in the opposite direction, normally occurs during the operation of the heating system and depends in part for the volume thereof upon the number of condensing units in operation. It must be borne in mind that the quantity of air that is removed from plenum B by the blower 30 through the duct 32 varies as the demand for heat requirement of the area A changes. It must also be understood that each change of quantity of air removed from plenum B and each change in the number of condensing units that are operating will effect the aforementioned operation of air between plenum B and plenum C. By means of the continuous recirculation and reheating of air a temperature differential is built up and maintained between the air in plenum B and the air in plenum C. Plenum B, in these circumstances, acts substantially as a heat reservoir for hot air to be supplied to area A and plenum C acts as a mixing chamber for fresh air, recirculated air from plenum B and air returning from area A. By this process not only is a substantial quantity of heated air made available for heating the area A, but the excess heat of the condensing units is removed from the vicinity thereof and the temperature of the air on the condensers maintained below the prescribed maximum limit.

The thermostats 60 will allow the aforedescribed recirculation and reheating process to continue and to allow the temperature to rise in plenum B until it reaches a predetermined setting, as for example, 90° to 115° F., which is near the maximum allowable temperature for "air off the condensers." The maximum allowable temperature, of course, is determined by the design of the condensers.

If the temperature in plenum B rises above the minimum setting of the thermostats 60, the aforesaid thermostats operate first to open partially and simultaneously the dampers 84 and 58, respectively positioned in the fresh air ducts 82 and the exhaust air ducts 55, to allow gravity to supply additional outdoor air for cooling of the condensing units. The thermostats 60 progressively actuate the dampers 84 and 58 to continue to open more widely as long as the temperature in plenum B continues to rise. When the dampers 84 and 58 are fully opened and the temperature in plenum B continues to rise, the thermostats 60 then actuate the exhaust fans 56 in the ducts 55 to exhaust overheated air from plenum B.

As described above, the size of the exhaust fans 56 would be selected to exhaust the total quantity of air expected to be required by the condensing units 66 and 70 in the summer. However, the size of the fans 56 are reduced and further economies are effected by the installation of the air conditioning evaporative condenser 86, which can pull its air from plenum B and discharge it through the roof. In the event that the temperature in plenum B continues to rise the thermostat 88 starts the evaporative condenser, even if the refrigerating system does not require its operation. When the evaporative condenser is in operation because of refrigeration demands, the demands on the exhaust fans 56 are, of course, proportionately reduced. A gravity or motorized back draft damper is installed in the evaporative condenser discharge duct to prevent pulling outdoor air into plenum B therethrough.

It will be appreciated that although this invention has been described with respect to a specific embodiment thereof which includes the cooling coil 26 in the system for cooling the building as desired, the invention is by no means limited to a combination heating and cooling system. On the contrary, the invention may be used as a heating system alone without the incorporation of cooling elements. Furthermore, the auxiliary heating coil 28 described in the specific embodiment of the invention may be included in the system or eliminated therefrom according to the requirements of the local environment in which the system is used. It will be appreciated, moreover, that where auxiliary heating is required, it may be supplied by any of a variety of means, such as steam, hot water, electricity and the like.

It will be appreciated that it is an important advantage of the heating and cooling system as provided in accordance with this invention and aforedescribed, that the waste heat of the condensing units of the refrigeration apparatus is effectively utilized in the heating system to supply heated air where needed in the building in which the system is installed.

Another significant advantage of the invention lies in the cushioning effect achieved by the continual recirculation of air in plenum B and C, whereby not only is the air successively reheated, but at the same time successfully maintained within the temperature limits required for the air passing across condensers.

Although this invention has been described with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features, all without departing from the spirit and scope of this invention as defined in the appended claims.

Having thus described my invention, I claim:

1. In a heating system for a building, the improvement which comprises an enclosure, a partition wall dividing said enclosure, a plurality of spaced openings formed in said wall, a plurality of spaced heat-dissipating units of refrigeration apparatus disposed adjacent a selected group of said openings, said heat-dissipating units being fewer in number than the total of said openings, means connected with said enclosure for drawing air into said enclosure on one side of said wall and for drawing air out of said enclosure on the opposite side thereof, means connected with said enclosure for maintaining the temperature of the air within said enclosure within predetermined limits on each side of said wall and means disposed adjacent said heat-dissipating units for propelling air across said units through the openings adjacent thereto and for forcing air from the opposite side of said wall back through the remaining openings therein.

2. In a heating system for building, the improvement which comprises an enclosure, a partition wall dividing said enclosure into an air-mixing chamber and a heated-air reservoir, a plurality of spaced openings formed in said wall, a plurality of spaced condensing units of refrigeration apparatus disposed in said air-mixing chamber adjacent a selected group of said openings, said units being fewer in number than said openings, means connected to said air-mixing chamber for conveying thereto return air from a remote part of said building, means for controlling the temperature of air in said mixing chamber within predetermined limits, means disposed in said air-mixing chamber adjacent said condensing units for propelling air across said units and into said heated-air reservoir, means connected to said heated-air reservoir for controlling the temperature of the heated air therein, and means connected with said heated-air reservoir for withdrawing heated air from said reservoir and conveying said air to a remote part of said building.

3. The heating system defined in claim 2 wherein said means for conveying return air to said mixing chamber comprises an air duct leading into said chamber adapted to extend from another part of said building and wherein said means for admitting fresh air into said chamber comprises an air duct leading into said chamber adapted to extend from outside said building.

4. The heating system defined in claim 3 further comprising means for operatively connecting said fresh air duct so that it is adapted to lead into said chamber from the roof of said building.

5. The heating system defined in claim 2 wherein said means for propelling air across said condensing units and into said heated-air reservoir comprises a plurality of fans, each of which is positioned behind one of said units and arranged to propel air toward said wall through the openings adjacent said units.

6. The heating system defined in claim 3 wherein said means for controlling the temperature of air in said mixing chamber within predetermined limits comprises a damper in said fresh air duct and a damper in said return air duct, said dampers being arranged to limit the volume of air admitted through said ducts.

7. The heating system defined in claim 5 wherein said means for controlling the temperature in said heated-air reservoir comprises an exhaust duct leading from said reservoir and adapted to extend to the outside of said building, said exhaust duct having a fan disposed therein arranged to draw air from reservoir and to propel said air through said duct to the outside of said building and a damper arranged to limit the volume of air admitted into said duct from said reservoir.

8. The heating system defined in claim 7 wherein a thermostat is disposed in said reservoir and connected to said damper and said fan in said exhaust duct.

9. The heating system defined in claim 2 wherein said means for withdrawing and conveying air from said reservoir to a remote part of said building comprises a heated air duct leading from said reservoir and adapted to extend to said remote part of said building and a blower fan disposed in said duct arranged to draw heated air from said duct and propel said air to said remote part of said building.

10. In a heating system for a building, the improvement which comprises an enclosure, a partition wall dividing said enclosure into an air-mixing chamber and a heated-air reservoir, a plurality of spaced openings formed in said wall, a plurality of spaced condensing units of refrigeration apparatus disposed in said air-mixing chamber adjacent a selected group of said openings, said units being fewer in number than said openings, means connected to said air-mixing chamber for conveying thereto return air from a remote part of said building, means for controlling the temperature of air in said mixing chamber within predetermined limits, means disposed in said air-mixing chamber adjacent said condensing units for propelling air across said units and into said heated-air reservoir, means connected to said heated-air reservoir for controlling the temperature of the heated air therein, an enclosed space forming an air handling unit, means for conveying heated air from said reservoir to said air handling unit, means connected to said air handling unit for admitting fresh air thereto from outside said building, cooperative means for controlling the volume of heated air and fresh air entering said air handling unit, means for propelling air from said air handling unit to a remote part of said building.

11. The heating system defined in claim 10 wherein said means for conveying heated air from said reservoir to said air handling unit comprises a heated air duct extending therebetween and wherein said means for conveying fresh air to said air handling unit comprises a fresh air duct leading to said unit adapted to extend from outside said building.

12. The heating system defined in claim 11 wherein said cooperative means for controlling the volume of heated air and fresh air entering said air handling unit comprises dampers disposed respectively in said heated air duct and said fresh air duct.

13. In a heating and cooling system for a building, the improvement which comprises an enclosure, a partition wall dividing said enclosure into an air-mixing chamber and a heated-air reservoir, a plurality of spaced openings formed in said wall, a plurality of spaced condensing units of refrigeration apparatus disposed in said air-mixing chamber adjacent a selected group of said openings, said units being fewer in number than said openings, means connected to said air-mixing chamber for conveying thereto return air from a remote part of said building, means for controlling the temperature of air in said mixing chamber within predetermined limits, means disposed in said air-mixing chamber adjacent said condensing units for propelling air across said units and into said heated-air reservoir, means connected to said heated-air reservoir for maintaining the temperature of the heated air therein below a maximum predetermined limit, an enclosed space forming an air handling unit, means for conveying heated air from said reservoir to said air handling unit, means connected to said air handling unit for admitting fresh air thereto from outside said building, cooperative means for controlling the volume of heated air and fresh air entering said air handling unit, means for propelling air from said air handling unit and adapted to extend to a remote part of said building, means disposed in said air handling unit for additionally heating the fresh air and heated air entering thereinto, means connected with said air handling unit for conveying thereto return air from a remote part of said building, means for controlling the volume of return air entering said air handling unit and means disposed in said air handling unit for cooling said return air.

14. In a heating and cooling system for a building, the improvement which comprises an enclosure, a partition wall dividing said enclosoure into an air mixing chamber and a heated air reservoir, a plurality of openings formed in said wall, said openings being arranged in horizontal rows and vertical columns, a plurality of spaced condensing units of refrigeration apparatus disposed in said air mixing chamber and arranged in rows adjacent alternate rows of said openings, a plurality of spaced ducts leading to said mixing chamber from a remote part of said building, a plurality of spaced ducts leading to said mixing chamber from outside said building, a damper disposed in each of said first and second-mentioned ducts, a plurality of spaced fans disposed behind each of said condensing units and arranged in one-to-one correspondence therewith, a plurality of spaced exhaust ducts leading from said reservoir to the outside of said building, a fan disposed in each of said third-mentioned ducts, a damper disposed in each of said third-mentioned ducts, and thermostat means to open the dampers and initiate operation of the fans in response to a rise in temperature in said building.

15. The heating and cooling system defined in claim 14 further including an enclosed space forming an air handling unit, a heated air duct extending between said reservoir and said air handling unit, a fresh air duct extending between said air handling unit and adapted to extend to the outside of said building, a damper disposed in said fourth-mentioned duct, a pair of dampers disposed in said fifth-mentioned duct, a supply air duct leading from said air handling unit and adapted to extend to a remote part of said building, a return air duct adapted to lead from said remote part of said building to said air handling unit, a damper disposed in said seventh-mentioned duct, and a blower fan situate in said air handling unit and arranged to propel air received thereinto through said fourth-, fifth-, and seventh-mentioned ducts through said sixth-mentioned duct to said remote part of said building.

16. The heating and cooling system defined in claim 17 wherein said air handling unit further includes auxiliary heating coils arranged to supply additional heat admitted into said unit from said fourth-and fifth-mentioned ducts and cooling coils arranged to cool air admitted into said unit from said fourth-, fifth- and seventh-mentioned ducts.

17. The heating and cooling systems defined in claim 16 further comprising means including a steam valve for supplying steam to said heating coils.

18. The heating and cooling system defined in claim 17 wherein means including a thermostat located in said remote part of said building is arranged to actuate said dampers in said first-, fourth-, fifth- and seventh-mentioned ducts, said steam valve and to control said cooling coils.

19. In a heating system for a building, the improvement which comprises an enclosure having two parts, heat-dissipating means including air passage means of refrigeration apparatus disposed between said two parts, air moving means for drawing air into the first part of said enclosure, across said heat-dissipating means into the second part of said enclosure and out of the second part of said enclosure for delivery into said building and control means together with said air passage means for maintaining the air on each side of said heat-dissipating means within predetermined limits and for causing recirculation of at least part of said air across said heat-dissipating means, said control means comprising thermostat means in the second part of said enclosure and damper means in the first part of said enclosure.

References Cited by the Examiner
UNITED STATES PATENTS

| | | | |
|---|---|---|---|
| 1,020,482 | 3/12 | De Neen | 62—419 |
| 2,077,296 | 4/37 | Wilkes | 62—158 |
| 2,259,803 | 10/41 | Cumming | 62—419 X |
| 2,309,165 | 1/43 | Candor | 165—29 |
| 2,479,128 | 8/49 | Maniscalco | 165—42 |
| 2,755,072 | 7/56 | Krueuttner | 165—62 X |
| 2,892,324 | 6/59 | Quick | 62—455 |

CHARLES SUKALO, *Primary Examiner.*

JAMES W. WESTHAVER, *Examiner.*